(12) United States Patent
Nanri et al.

(10) Patent No.: US 6,519,937 B2
(45) Date of Patent: Feb. 18, 2003

(54) CONTROL METHOD FOR CONTINUOUSLY VARIABLE TRANSMISSION

(75) Inventors: Takehiko Nanri, Saitama (JP); Yoshinobu Itani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,666

(22) Filed: Mar. 30, 2001

(65) Prior Publication Data

US 2001/0039800 A1 Nov. 15, 2001

(30) Foreign Application Priority Data

Mar. 31, 2000 (JP) ........................................ 2000-099453

(51) Int. Cl.[7] .............................................. F16D 31/00
(52) U.S. Cl. ........................................... 60/327; 60/448
(58) Field of Search ........................ 92/12.2, 327, 448, 92/445, 446, 447, 449, 450, 451, 452

(56) References Cited

U.S. PATENT DOCUMENTS

| | | | | |
|---|---|---|---|---|
| 3,892,283 A | * | 7/1975 | Johnson | 60/448 X |
| 3,986,358 A | * | 10/1976 | Hoffmann | 60/447 X |
| 4,082,013 A | * | 4/1978 | Dornfeld et al. | 477/68 |
| 4,368,798 A | * | 1/1983 | Meyerle et al. | 60/448 X |
| 4,445,329 A | * | 5/1984 | Drisko | 60/448 X |
| 4,474,104 A | * | 10/1984 | Creffield | 60/447 X |
| 4,566,274 A | * | 1/1986 | Heiser et al. | 60/448 X |
| 4,672,811 A | * | 6/1987 | Yoshida et al. | 60/445 |
| 4,693,081 A | * | 9/1987 | Nakamura et al. | 60/448 |
| 4,976,169 A | * | 12/1990 | Sasajima et al. | 60/449 X |
| 5,435,131 A | * | 7/1995 | Hausman et al. | 60/448 X |
| 5,524,436 A | * | 6/1996 | Ishino et al. | 60/448 |
| 5,592,817 A | * | 1/1997 | Nishimura et al. | 60/448 X |
| 5,784,883 A | * | 7/1998 | Ohkura et al. | 60/448 X |
| 5,904,044 A | * | 5/1999 | White | 92/12.2 X |
| 5,996,343 A | * | 12/1999 | Kuras | 60/448 |

FOREIGN PATENT DOCUMENTS

| | | |
|---|---|---|
| JP | 2527199 | 3/1989 |
| JP | 8082354 | 3/1996 |

* cited by examiner

*Primary Examiner*—John E. Ryznic
(74) *Attorney, Agent, or Firm*—Birch, Stewart, Kolasch & Birch, LLP

(57) ABSTRACT

A hydrostatic continuously variable transmission includes a fixed capacity hydraulic pump and a variable capacity hydraulic motor, connected by a hydraulic closed circuit. A control system and method for the variable transmission provides a good deceleration feeling when going downhill. In accordance with the control system and method, a range of a selected gear is determined. Next, it is determined whether the vehicle is in an automatic gear shift mode. If these conditions are met, it is then determined whether or not certain criteria for descent control are satisfied. The certain criteria may include: (1) whether the throttle is closed; (2) a speed or acceleration of the vehicle; (3) whether the acceleration exceeds a threshold; and (4) whether simultaneous satisfaction of conditions (1)–(3) exist for a period of time exceeding a fixed time. If all of the criteria are satisfied, the gear ratio is shifted by a specified amount towards a LOW side. Therefore, when driving downhill, the vehicle is not subject to acceleration greater than a predetermined value.

20 Claims, 8 Drawing Sheets

CONTROL METHOD FOR CONTINUOUSLY VARIABLE TRANSMISSION

BACKGROUND OF THE INVENTION

1. Field of the Invention

The present invention relates to an automatic transmission for a vehicle. More particularly, the present invention relates to a hydrostatic continuously variable transmission in which a fixed capacity hydraulic pump and a variable capacity hydraulic motor are connected by a hydraulic closed circuit.

2. Description of the Relevant Art

Hydrostatic continuously variable transmissions are well-known. Such transmissions are applied to various vehicles, such as motorcycles. Japanese Patent No. 2527199 describes a control method for a hydrostatic continuously variable transmission, in which an actual rotation speed (Ne) of a crankshaft, or the like, is compared with a target rotational speed (Ne), which has been determined in accordance with predetermined conditions, and an output is controlled by adjusting an inclination angle of a swash plate.

Japanese Patent Laid-Open No. Hei 8-82354 discloses a control method for a continuously variable transmission in which a gear ratio is controlled in a step-by-step manner, as in a manual multi-step transmission (this method is called "multi-stage variable transmission control").

When a throttle is closed during downhill driving, for example, the foregoing continuously variable transmission holds the gear ratio at a value immediately prior to downhill driving in order that the vehicle can smoothly decelerate.

The prior art suffers several drawbacks. When a vehicle provided with such a continuously variable transmission and pulling a heavy trailer or the like is driving downhill, it is pushed from behind. Although the throttle is closed in order to maintain the gear ratio, the vehicle is gradually accelerated during the downhill driving. Therefore, there is a need in the prior art for a control method for a continuously variable transmission, which enables a vehicle to reliably drive without acceleration even in the foregoing situation.

SUMMARY OF THE INVENTION

It is an object of the present invention to solve one or more of the drawbacks associated with the background art.

A continuously variable transmission of the present invention comprises a control method for controlling the continuously variable transmission, which continuously varies a gear ratio, wherein the gear ratio is changed by a predetermined amount to a LOW side from a normal gear ratio and acceleration is regulated to be below a predetermined value when a throttle is closed and acceleration is above the predetermined value.

In accordance with the present invention, when a throttle is closed and acceleration of a vehicle exceeds the prescribed value, control is performed to shift the gear ratio by a prescribed amount towards the LOW side from that immediately before, so that the acceleration is regulated to be equal to or less than the predetermined value. As a result, a feeling of natural deceleration is obtained when a throttle is closed. Therefore, this is especially effective when driving a vehicle pulling a trailer or the like downhill. Even if the trailer pushes the vehicle from behind, the vehicle can be driven without acceleration.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INTENTION

Figure 1:
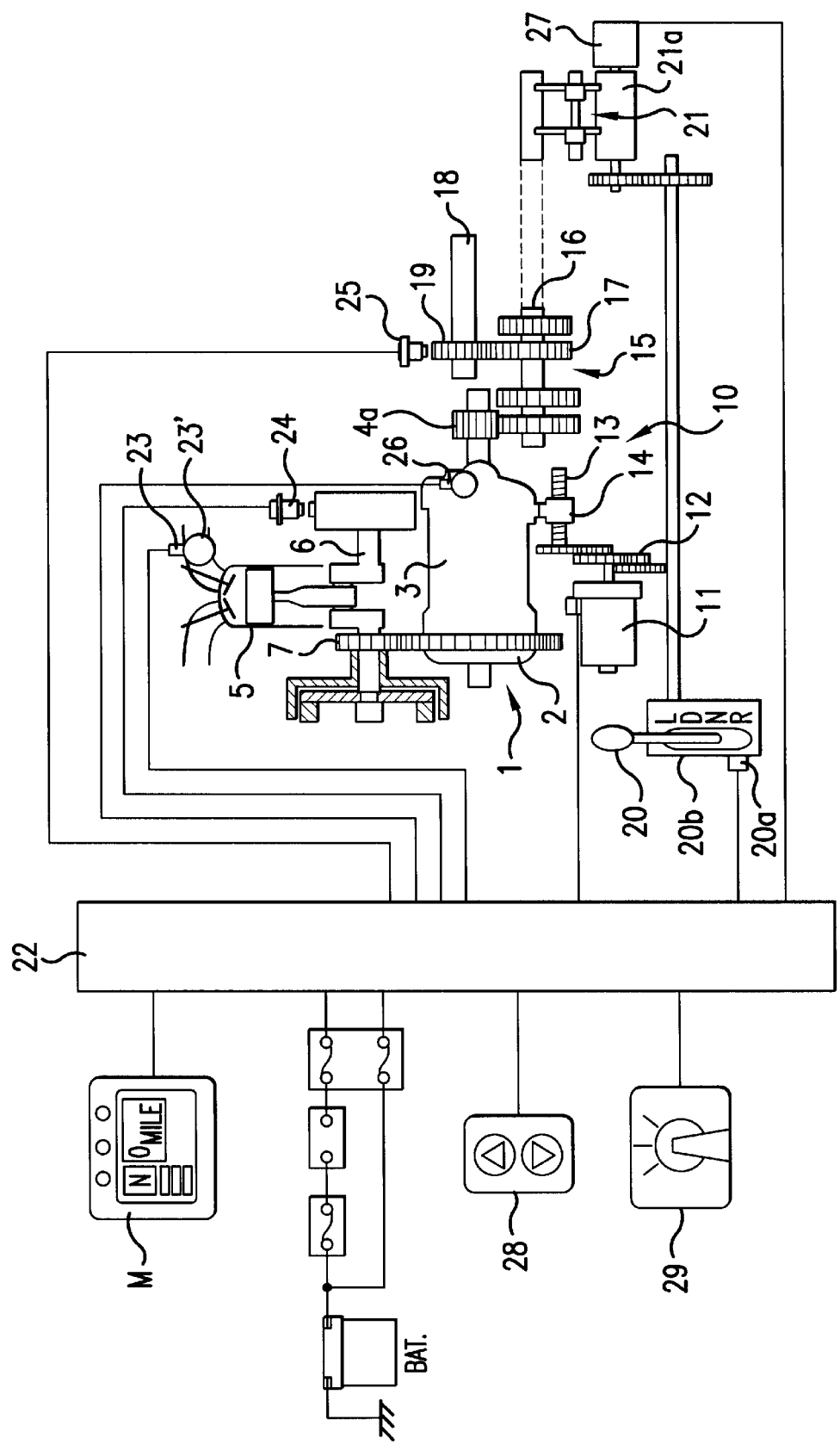
FIG. 1 illustrates a control system, in accordance with the present invention.

Referring to FIG. 1, a hydrostatic continuously variable transmission 1 comprises a fixed capacity hydraulic pump 2 and a variable capacity hydraulic motor 3 integrally provided on a drive shaft 4, with the fixed capacity hydraulic pump 2 and the variable capacity hydraulic motor 3 being connected by a hydraulic closed circuit. A drive gear 7 provided on a crankshaft 6 of an engine 5 rotates a driven gear 8 of the fixed capacity hydraulic pump 2, thereby providing hydraulic pressure thereto. This hydraulic pressure rotates the variable capacity hydraulic motor 3 at a variable speed, which transmits a changed output to the drive axle 4. A gear ratio can be arbitrarily changed by the inclination angle control mechanism 10 that changes an inclination angle of the movable swash plate (to be described later) of the variable capacity hydraulic motor 3.

The inclination control mechanism 10 transmits the output of a control motor 11 via a linkage system, including a reduction gear 12, and changes the inclination angle of the movable swash plate built into the variable capacity hydraulic motor 3 through a threaded rod and follower, such as a ball screw 13 and a slider 14. The transmission output of the hydrostatic continuously variable transmission 1 is transmitted from an output gear 4a of the drive axle shaft 4 to a sub gear train 15, being a secondary reduction gear train. A transmission output of sub gear train 15 is transmitted from an output gear 17 on a transmission shaft 16 to a final output gear 19 on a final output shaft 18.

The sub gear train 15 is switched by manually operating a sub-transmission lever 20 mounted on a drive range change-over switch 20b to drive a shifter 21, so that each shift position of L or D on the forward side, reverse R, or neutral N can be selected. The range L is for driving at low speed, the range D is for driving at normal or ordinary speed, N is for neutral, and R is for reverse driving. When the shift position R is selected, the gear ratio is fixed at a LOW ratio (e.g., a ratio of transmission output/input is relatively lower).

Each of the L and D shift positions on the forward side can be switched to various drive modes (to be described later) by a mode map switch 29 provided on a steering handle. The drive modes roughly comprise an automatic shift mode and a multi-stage variable transmission mode. When the variable transmission is selected, shift-up and shift-down can be manually performed by operating a shift switch 28 provided on the handle.

Figure 7:
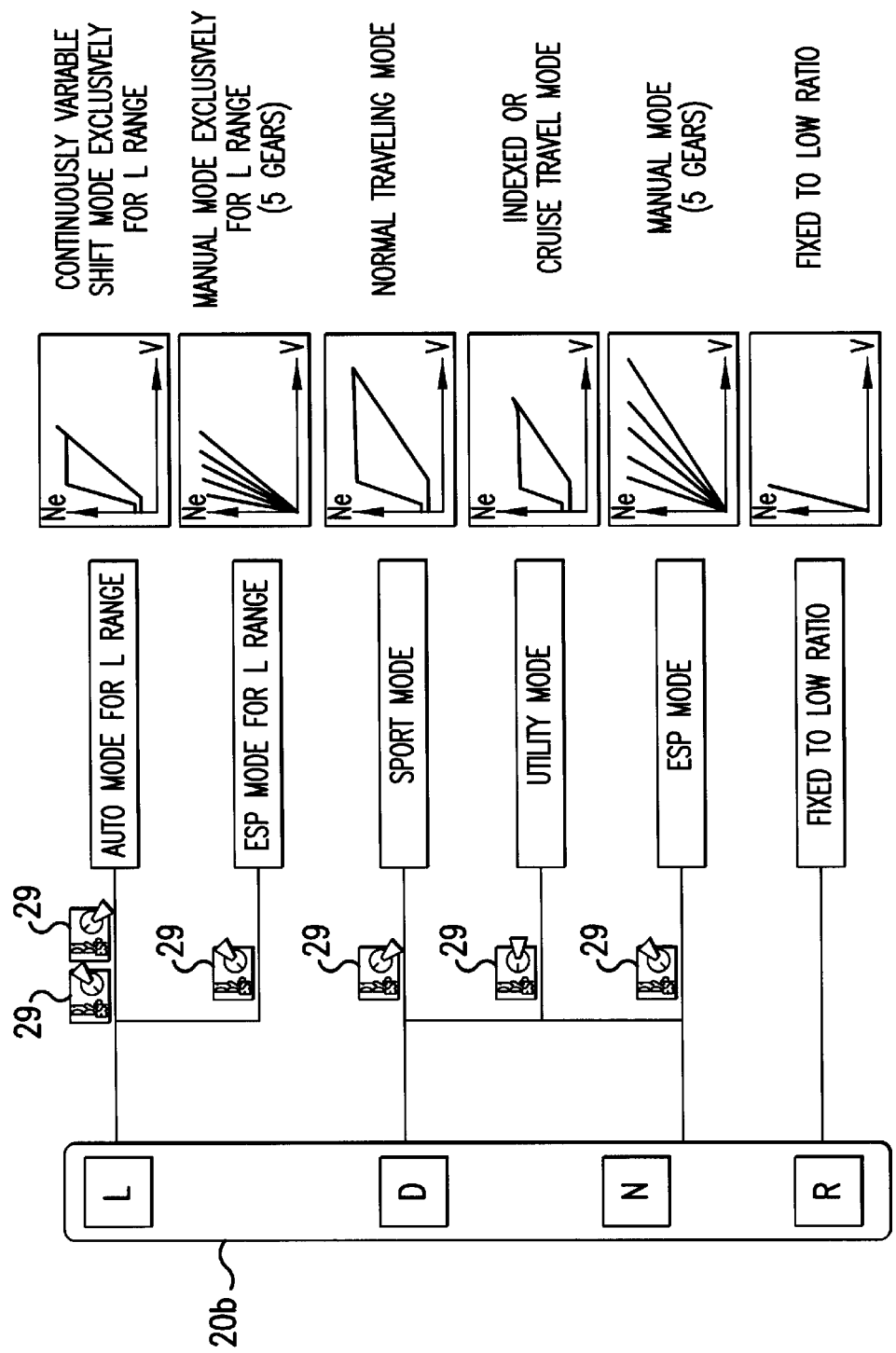
FIG. 7 is a diagram of various modes.

FIG. 7 describes predetermined drive modes. When the L range is selected by the sub-transmission lever 20, the mode map switch 29 is switched to D1 or D2, and a mode is changed to an L range auto mode of the continuously variable transmission mode dedicated to the L range. Further, when the mode map switch 29 is switched to ESP, the mode is changed to an L range ESP mode of the manual mode dedicated to the L range, enabling manual change of 5 gears on the forward side.

When the D range is selected, the mode map switch 29 is switched to D1, and a sports mode suitable for normal driving is selected. When the mode map switch 29 is switched to D2, a utility mode suitable for pulling trailers or cruising is selected. When switched to ESP, the manual mode for normal driving is adopted, in which it is possible to manually change 5 gears on the forward side.

In the continuously variable transmission and multi-stage variable transmission, the gear ratio is actually changed by inclination angle control. The inclination angle control is performed by a control unit 22, which controls the operation of the control motor 11 of the inclination angle control mechanism 10, based on signals from various sensors. In addition, the control unit 22 outputs display signals to indicators of an instrument panel M, and is provided with power from a battery on the vehicle.

As shown in the FIG. 1, the control unit 22 receives for the inclination control mechanism 110 the following signals, which are an angle signal of a throttle 23' from a throttle sensor 23 mounted on the intake side of the engine 5, an Ne signal from a rotation sensor 24 located near the crankshaft 6, a vehicle speed signal from a speed sensor 25 located near the final output gear 19, an inclination angle signal from an angle sensor 26 provided at the variable capacity hydraulic motor 3, shift position signals from a shift sensor 27 integrated with a shift drum 21 a of a shifter 21 so as to detect shift positions, and signals from the shift switch 28 and mode map switch 29 provided in the steering wheel. Further, the control unit 22 receives a signal from a lever switch 20a located at the lower part of a sub-transmission lever 20 of the drive range change-over switch 20b.

Figure 2:
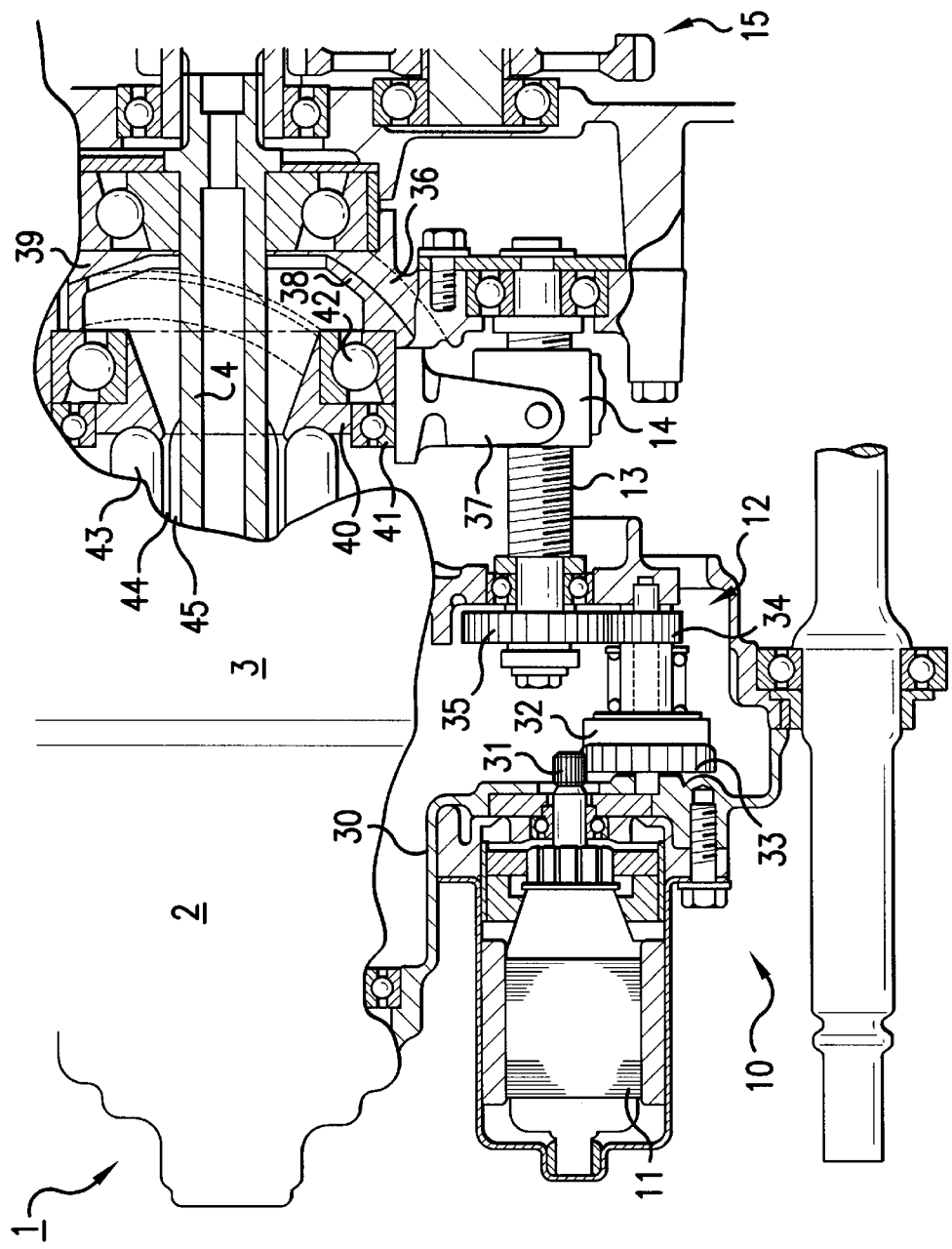
FIG. 2 is a partial cross sectional view illustrating mechanical components for inclination angle control of a movable swash plate, in a hydrostatic continuously variable transmission.

Next, a description is given of the inclination angle control mechanism 10 shown in FIG. 2. The control motor 11, of the inclination angle control mechanism 10, is supported by a housing 30 of the fixed capacity hydraulic pump 2. An output of the control motor 11 is transmitted to a ball screw drive gear 35 from a gear 34 through an input gear 33 of a torque limiter 32. The input gear 33 is driven by an output gear 31 of the control motor 11. The ball screw drive gear 35 rotates together with the ball screw 13. As the ball screw 13 rotates forward or backward, the slider 14 having a nut slides on the shaft in either direction. Both ends of the ball screw 13 are supported by a housing 36 of the hydraulic motor 3.

An arm 37 extending from the housing 36 has one end thereof rotatably attached to the slider 14, and the other end thereof integrated with a swash plate holder 38 supported in the housing 36. The swash plate holder 38 is rotatably supported on a concave surface 39 of the housing 36. When the arm 37 rotates, the swash plate holder 38 also rotates on the concave surface 39 and changes the angle of the movable swash plate 40.

The movable swash plate 40 is rotatably held against the inner side of the swash plate holder 38 via bearings 41 and 42, and by varying the angle of the swash plate holder 38, the inclination angle formed between a rotation surface of the movable swash plate 40 and the axis of the drive shaft 4 is altered. FIG. 2 illustrates an angle of 90°, which is a TOP state where the gear ratio is 1.0.

Hydraulic plungers 43 of the variable capacity hydraulic motor 3 are pressed against this movable swash plate 40. A plurality of hydraulic plungers 43 are provided in a peripheral direction of a rotating body 44, and are pushed out so as to press against the variable swash plate 40 side by the hydraulic pressure at the fixed capacity hydraulic pump 2 side. Rotational force is supplied to the rotating body 44 according to the inclination angle of the variable swash plate 40. The rotating body 44 is fitted on the drive shaft 4 using a spline joint 45, and the drive shaft 4 is driven to rotate by rotation of the rotating body 44.

Figure 3:
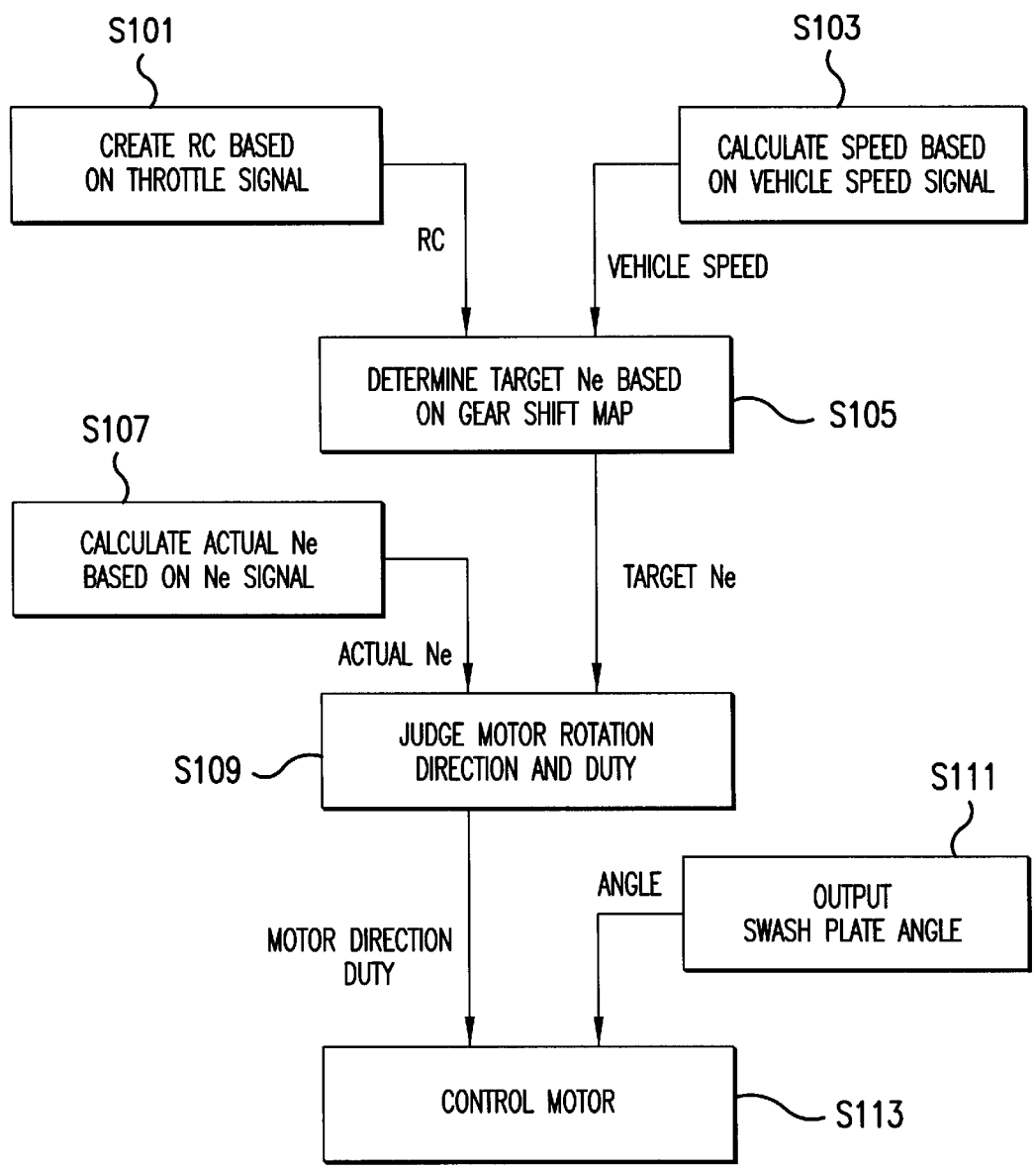
FIG. 3 is a flowchart of a continuously variable transmission control method.

Next, gear shift control for a continuously variable transmission in the control unit 22 will be described using FIG. 3. In step S101, RC (riding conditions) are created from a throttle signal sent from the throttle sensor 23. RC basically increases or decreases in accordance with the value of the throttle signal:

(1) When the throttle 23' is opened, RC increases;

(2) When the throttle 23' is closed, RC decreases.

Figure 4:
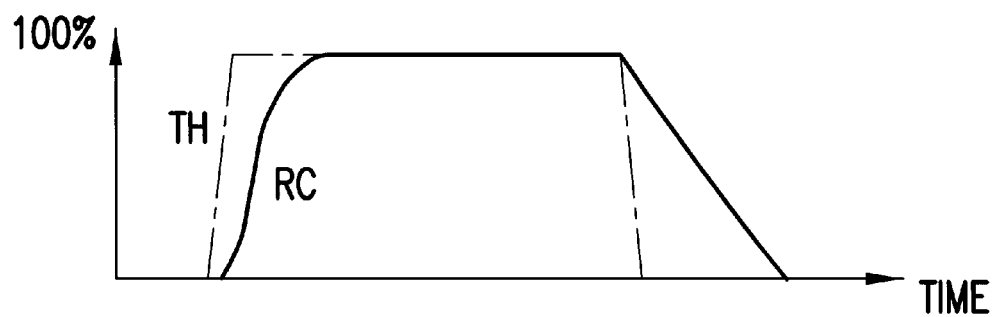
FIG. 4 is a graph used in determining RC (riding conditions)

In FIG. 4, TH stands for a throttle opening amount. The vertical axis represents the throttle opening amount and RC (each given as a %). The horizontal axis represents time.

Figure 5:
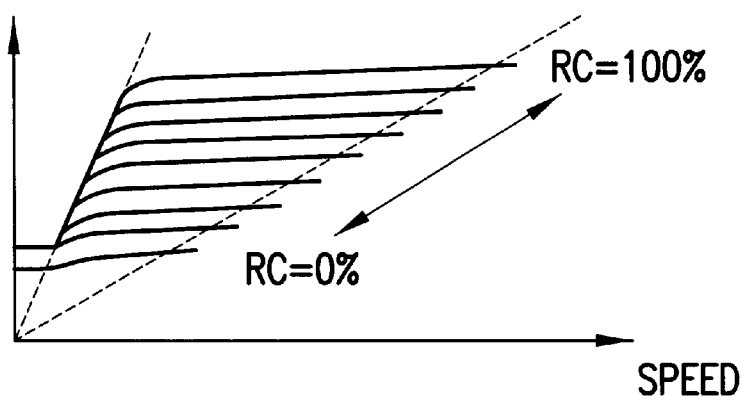
FIG. 5 is a graph illustrating a gear shift map.

In step S103, vehicle speed is calculated separately from a vehicle speed signal sent from the throttle sensor 25. Following, in step S105, a target Ne (e.g. rotation sped) is determined with reference to a previously built-in or stored gear shift map, based on the RC and the vehicle speed. One example of a gear shift map is shown in FIG. 5, in which a predetermined number of types have been prepared. For example, various modes such as L range exclusive, sports mode exclusive, utility mode exclusive etc. are stored, and these can be selected using the mode map switch 29.

In step S107, actual Ne is calculated from an Ne signal sent from the rotation sensor 24. In step S109, the actual Ne and the target Ne are compared, and it is determined whether the rotation direction of the control motor 11 should be forward or reverse, and DUTY is determined. Specifically, a determination is made for the movement direction of the movable swash plate as described in the following:

actual Ne>target Ne→movable swash plate is moved toward the TOP side;

actual Ne<target Ne→movable swash plate is moved toward the LOW side.

Duty is also determined from the following equation:

$$\text{DUTY} = K1 \times |\text{actual Ne} - \text{target Ne}| \text{ (where } K1 \text{ is a coefficient)}$$

Here, duty represents a proportion or level of current flowing in the control motor 11, and is used in speed control of the control motor 11. With DUTY at 100% the control motor 11 is at maximum speed, while with DUTY at 0% the motor is stopped.

In step S113, the control motor 11 is controlled based on a rotation direction of the motor and a movable swash plate angle calculated based on DUTY and an angle signal from the angle sensor 26 (as determined in step S111). Specifically, the control motor 11 is driven using motor rotation direction and DUTY, each of the LOW and TOP ratios are measured using the movable swash plate angle, and at the time of disconnection from the TOP ratio, the control motor 11 is stopped.

In this embodiment, stepped gear shift control is possible using a stepped gear shift mode. Stepped gear shift control means gear shift control that can manually shift a gear ratio, such as a many stepped transmission, as if it were a continuously variable transmission. This type of stepped gear shift control is carried out by controlling an inclination angle of the movable swash plate 40 under control of the control unit 22 in the same way as for the case described up to now, but in this case it is sufficient to only change the control method so as to carry out stepwise gear shifting.

Switching between this type of stepped gear shift mode and the automatic gear shift mode is carried out by a mode switch 29, and a stepped gear shift operation when in stepped gear shift mode is carried out by pressing the shift switch 28. The shift switch 28 is provided with a shift up button and a shift down button, and each time one of these buttons is pressed the gears are shifted up or shifted down by one stage.

Figure 6:
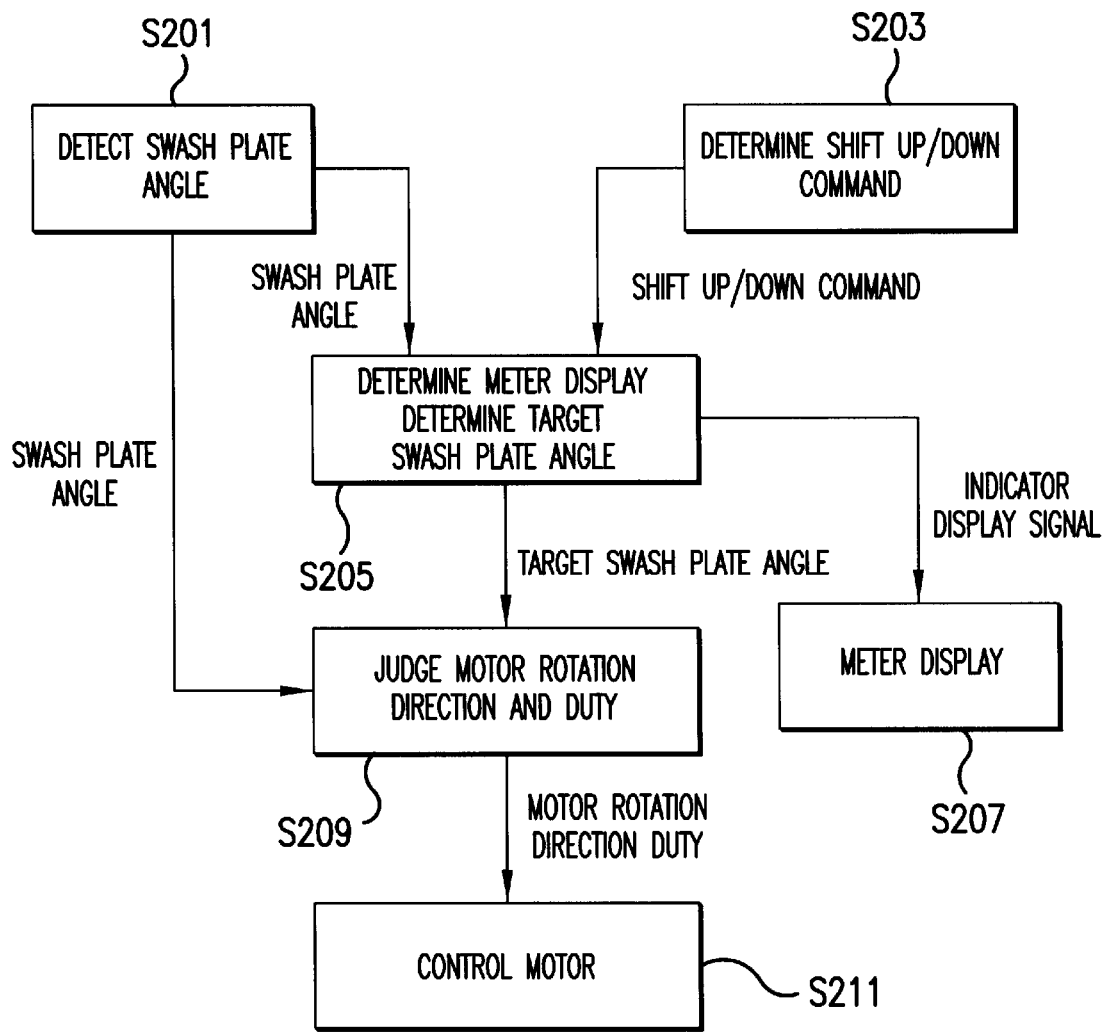
FIG. 6 is a flowchart of a multi-stage variable transmission control method.

FIG. 6 shows a control procedure of the control unit 22 for stepped gear shift control. In step S201, an inclination angle is calculated from the swash plate inclination angle signal from the angle sensor 26. In step S203, a shift command making the operation content shift up or shift down is determined using a shift signal from the shift switch 28. This determination sets a shift up command if the shift up button of the shift switch 28 is pressed, or sets a shift down command if the shift down button of the shift switch 28 is pressed.

In step S205, a meter display determination and a target swash plate angle are determined based on the above described inclination angle and shift command. The meter display determines a number of gear stages, which corresponds to a number of shift stages of a manual transmission, using the inclination angle. Next, the meter display determines a display signal to go to an indicator of the meter M, and outputs this signal to the meter M. In step S207, the determined number of gear stages is displayed on the meter M.

Determination of the target inclination angle for the swash plate 40 is established under the following conditions, with respect to a current gear display signal, when there is input of a shift command:

shift up command→single stage shift up shift down command→single stage shift down Following that, in step S209, the target swash plate angle (determined in step S205) is compared with the inclination angle (S201), and based upon the comparison the forward or reverse rotation direction of the control motor 11 and DUTY are determined from the following:

inclination angle>target swash plate angle→shift movable swash plate 40 toward the LOW side;

inclination angle<target swash plate angle→shift movable swash plate 40 toward the TOP side.

DUTY is determined from the following equation:

$$DUTY = K2 \times |\text{inclination angle} - \text{target swash plate angle}| \text{ (where } K2 \text{ is a coefficient)}$$

Next, in step S211, the control motor 11 is drive controlled based on the motor rotation direction and the DUTY, to incline or decline the movable swash plate 40 to a specified angle. In this way, the hydrostatic continuously variable transmission 1 can carry out stepped gear shifting, which is corresponds to a stepped gear shifting of a manual multi-stepped transmission.

Figure 8:
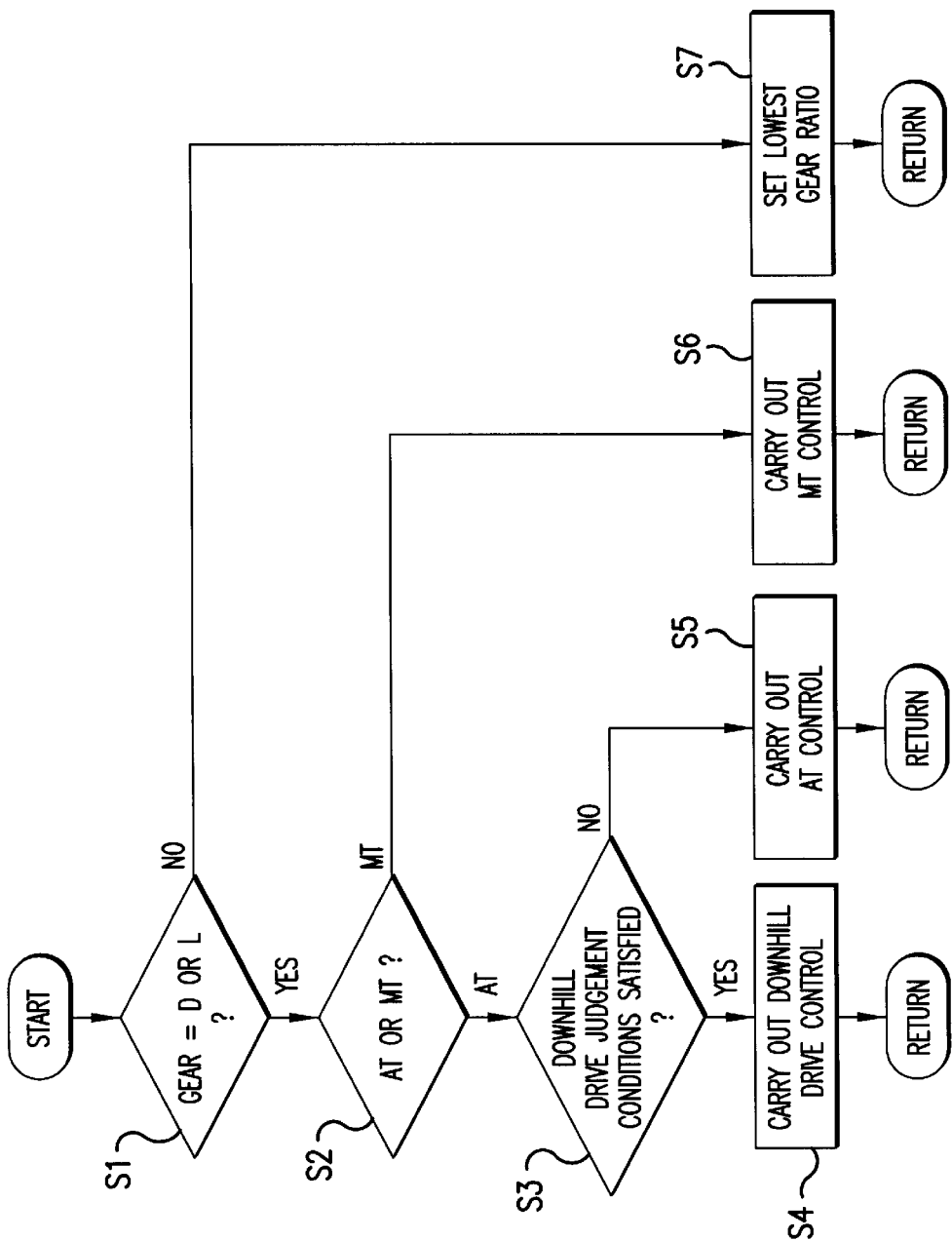
FIG. 8 is a flowchart of a downhill drive control method.
Figure 9:
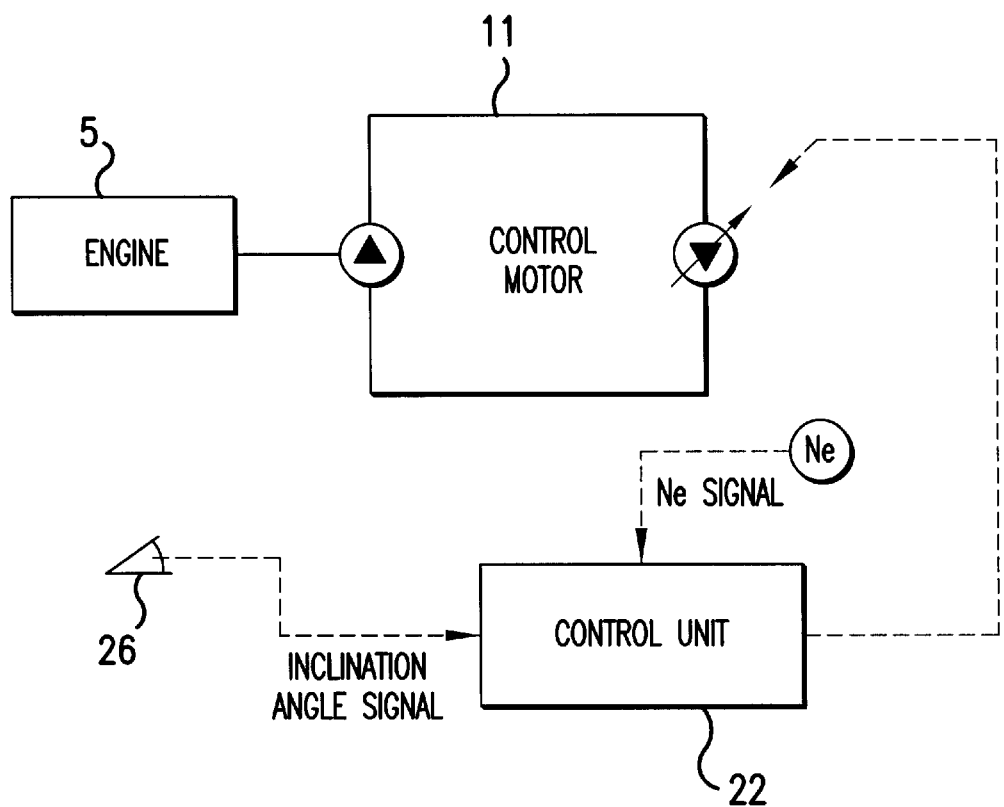
FIG. 9 is a diagram providing a simplified illustration of the apparatus of the present invention.

This embodiment also has a descent control function. FIG. 8 is a flow chart showing this descent control method for the control unit 22. If control is started, the first thing to occur is that it is judged whether or not a selection position of the travel range selection switch 20b set using the sub-transmission lever 20, namely the gear being selected, is in the D range or the L range (step S1). If the result of this judgment is YES, processing proceeds to the next step S2. If the result is NO, processing transfers to step S7, where a reverse (R) position or a neutral (N) position is set and the gear ratio is fixed at LOW.

In step S2, it is judged whether or not one of automatic mode (AT) or stepped transmission mode (MT) are set. If it is AT, processing proceeds to step S3. If it is MT, processing proceeds to step S6 and MT control is carried out, which will be described later. In step S3, it is judged whether or not judgment conditions for descent judgment are satisfied. If the result is YES, the descent control of step S4 is carried out. If the result is NO, processing transfers to step S5, and regular AT control is performed.

The descent control of step S4 involves control to shift a gear ratio to the LOW side by only a prescribed amount from the immediately preceding value, when the descent judgment conditions are met, so that acceleration above a specified value does not occur. The descent judgment conditions are brought about by satisfying all of the following conditions:

Throttle 23' closed. Specifically, it is determined that the throttle 23' is closed when a throttle signal voltage from the throttle sensor 23 is lower than a predetermined threshold;

Vehicle speed generated (using the signal of the speed sensor 25); Acceleration exceeding a threshold; Simultaneous formation of conditions (1)–(3) for in excess of a fixed time.

If these descent control conditions are satisfied, the current gear shift position is detected from the angle sensor 26, a target gear shift position where the current position is shifted by a specified amount towards the LOW side is determined, and DUTY and rotation directions are determined for the control motor 11 of the inclination angle control mechanism 10 to change the gear ratio by driving the control motor 11.

By performing control in this way, there is no acceleration when descending which means that a good deceleration feeling is obtained. In particular, when descending while hauling a trailer or the like there is no acceleration due to the heavy trailer or the like pushing from behind, which is advantageous for downhill travel while hauling a heavy object, such as a trailer.

The present invention is not limited to the above described embodiments, and various modifications and applications are possible. For example, it is possible for the present invention to apply not only to a hydrostatic continuously variable transmission system, but also to improved precision position detection system, such as a CTV system, or an electronically controlled belt conveyor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of controlling a hydrostatic continuously variable transmission, which includes a fixed capacity hydraulic pump and a variable capacity hydraulic motor connected thereto, wherein a gear ratio of the variable transmission is changed by altering an angle of a moveable swash plate, said method comprising the steps of:

sensing a condition of a throttle of a vehicle;

when the throttle is sensed to be closed, comparing an acceleration of the vehicle to a predetermined value;

when the acceleration of the vehicle exceeds the predetermined value, altering the angle of the moveable swash plate; and thereby changing a gearing ratio of the variable transmission.

2. The method according to claim 1, wherein said step of altering the angle of the swash plate and said step of changing a gearing ratio of the variable transmission occur until the vehicle has an acceleration, which is less than or equal to the predetermined value.

3. The method according to claim 1, wherein said step of altering the angle of the swash plate occurs only when a situation one (1) and a situation two (2) exist simultaneously, with situation one being (1) the throttle is sensed to be closed, and situation two being (2) the acceleration exceeds the predetermined value.

4. The method according to claim 1, wherein said step of altering the angle of the swash plate occurs only when a situation one (1) and a situation two (2) exist simultaneously for a period of time exceeding a threshold time, with situation one being (1) the throttle is sensed to be closed, and situation two being (2) the acceleration exceeds the predetermined value.

5. The method according to claim 4, wherein said step of altering the angle of the swash plate and said step of changing a gearing ratio of the variable transmission occur until the vehicle has an acceleration, which is less than or equal to the predetermined value.

6. The method according to claim 1, wherein said step of altering the angle of the swash plate includes altering the swash plate angle, such that an output/input gearing ratio of the variable transmission is decreased.

7. The method according to claim 1, wherein said step of altering the angle of the swash plate includes:

providing a control motor, and a linkage system intermediate the control motor and the movable swash plate;

activating the control motor; and moving the movable swash plate, via the linkage system.

8. The method according to claim 7, wherein the linkage system includes a threaded rod and a follower engaging threads of the threaded rod and connected to the swash plate, and wherein said step of moving the movable swash plate includes:

rotating the threaded rod; and traversing the follower along the threaded rod.

9. The method according to claim 8, wherein said step of altering the angle of the swash plate includes altering the swash plate angle, such that an output/input gearing ratio of the variable transmission is decreased.

10. A hydrostatic continuously variable transmission for a vehicle comprising:

a fixed capacity hydraulic pump;

a variable capacity hydraulic motor connected to said fixed capacity hydraulic pump, wherein said variable capacity hydraulic motor includes a movable swash plate;

a control motor; and a linkage system connecting said control motor to said movable swash plate, wherein an angle of said movable swash plate is altered by activating said control motor when a throttle is sensed to be closed and an acceleration of the vehicle exceeds a predetermined value.

11. The hydrostatic continuously variable transmission according to claim 10, further comprising:

a controller connected to said control motor; and a speed sensor connected to said controller.

12. The hydrostatic continuously variable transmission according to claim 10, further comprising:

a controller connected to said control motor; and a throttle position sensor connected to said controller.

13. The hydrostatic continuously variable transmission according to claim 12, further comprising:

a speed sensor connected to said controller.

14. The hydrostatic continuously variable transmission according to claim 13, wherein said speed sensor judges a rotational speed of a transmission shaft downstream of said variable transmission.

15. The hydrostatic continuously variable transmission according to claim 14, wherein said transmission shaft downstream of said variable transmission is an final output shaft, and wherein said speed sensor includes an encoder for measuring the rotation speed of said final output shaft.

16. The hydrostatic continuously variable transmission according to claim 10, wherein said linkage system includes a threaded rod driven to rotate by said control motor, and a follower engaged to threads of said threaded rod for traversing said threaded rod, when said threaded rod rotates.

17. The hydrostatic continuously variable transmission according to claim 16, wherein said follower is connected to said movable swash plate.

18. The hydrostatic continuously variable transmission according to claim 17, further comprising:

a controller connected to said control motor; and a throttle position sensor connected to said controller.

19. The hydrostatic continuously variable transmission according to claim 18, further comprising:

a speed sensor connected to said controller.

20. The hydrostatic continuously variable transmission according to claim 19, wherein said speed sensor judges a rotational speed of a transmission shaft downstream of said variable transmission.

* * * * *